US010116957B2

(12) United States Patent
Xu et al.

(10) Patent No.: US 10,116,957 B2
(45) Date of Patent: Oct. 30, 2018

(54) DUAL FILTER TYPE FOR MOTION COMPENSATED PREDICTION IN VIDEO CODING

(71) Applicant: GOOGLE LLC, Mountain View, CA (US)

(72) Inventors: Yaowu Xu, Saratoga, CA (US); Jingning Han, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 37 days.

(21) Appl. No.: 15/266,400

(22) Filed: Sep. 15, 2016

(65) Prior Publication Data
US 2018/0077423 A1    Mar. 15, 2018

(51) Int. Cl.
*H04N 19/13*    (2014.01)
*H04N 19/513*    (2014.01)
*H04N 19/159*    (2014.01)
*H04N 19/105*    (2014.01)
*H04N 19/82*    (2014.01)
*H04N 19/124*    (2014.01)
*H04N 19/61*    (2014.01)
*H04N 19/176*    (2014.01)
(Continued)

(52) U.S. Cl.
CPC ......... *H04N 19/513* (2014.11); *H04N 19/105* (2014.11); *H04N 19/124* (2014.11); *H04N 19/13* (2014.11); *H04N 19/159* (2014.11); *H04N 19/61* (2014.11); *H04N 19/82* (2014.11); *H04N 19/172* (2014.11); *H04N 19/176* (2014.11); *H04N 19/182* (2014.11)

(58) Field of Classification Search
CPC ...... H04N 7/364; H04N 7/50; H04N 7/26808; H04N 5/145; H04N 7/26739
USPC ..................................... 375/240.17
See application file for complete search history.

(56) References Cited

U.S. PATENT DOCUMENTS 4,523,230 A * 6/1985 Carlson .................... H04N 5/21
                                                              348/623
8,379,697 B2 * 2/2013 Sampath ................ H04B 1/525
                                                              375/219
(Continued)

OTHER PUBLICATIONS

Takamura et al, Multiband video coding using H.264/AVC MPEG-4 studio profile and JPEG 2000 (Year: 2004).*
(Continued)

*Primary Examiner* — Shan E Elahi
(74) *Attorney, Agent, or Firm* — Young Basile Hanlon & MacFarlane, P.C.

(57) ABSTRACT

Inter-prediction using a dual filter type is described. To decode a video frame, a block location within a reference frame is determined using a motion vector and a location of a current block to be decoded. Rows of pixel values of a temporal pixel block or columns of pixel values of the temporal pixel block are generated applying a first interpolation filter to pixels corresponding to the block location along a first axis. Columns of pixel values or rows of pixel values for a first prediction block are generated by applying a second interpolation filter to the pixel values of the temporal pixel block along a second axis perpendicular to the first axis. The first and second interpolation filters are different. An encoded residual block is decoded to generate a residual block, and combining the residual block with the first prediction block reconstructs the current block.

19 Claims, 8 Drawing Sheets

(51) Int. Cl.
*H04N 19/172* (2014.01)
*H04N 19/182* (2014.01)

(56) References Cited

U.S. PATENT DOCUMENTS

| | | | |
|---|---|---|---|
| 2004/0062307 A1 | 4/2004 | Hallapuro et al. | |
| 2008/0069203 A1 | 3/2008 | Karczewicz et al. | |
| 2008/0095284 A1* | 4/2008 | Hori | H04B 1/707 375/350 |
| 2008/0247467 A1 | 10/2008 | Rusanovskyy et al. | |
| 2010/0074332 A1* | 3/2010 | Karczewicz | H04N 7/50 375/240.12 |
| 2010/0284458 A1 | 11/2010 | Andersson et al. | |
| 2012/0155548 A1* | 6/2012 | Diggins | G06T 7/0002 375/240.24 |
| 2012/0170650 A1 | 7/2012 | Chong et al. | |
| 2012/0183068 A1 | 7/2012 | Lou et al. | |
| 2012/0224098 A1 | 9/2012 | Lou et al. | |
| 2012/0224639 A1 | 9/2012 | Lou et al. | |
| 2012/0230407 A1 | 9/2012 | Minoo et al. | |
| 2012/0230413 A1 | 9/2012 | Lou et al. | |
| 2012/0328020 A1 | 12/2012 | Lou et al. | |
| 2013/0003841 A1 | 1/2013 | Minoo et al. | |
| 2013/0051463 A1 | 2/2013 | Minoo et al. | |
| 2014/0010282 A1* | 1/2014 | He | H04N 21/23439 375/240.02 |
| 2014/0078394 A1 | 3/2014 | Lou et al. | |
| 2014/0105325 A1* | 4/2014 | Huang | H04L 27/2649 375/296 |
| 2014/0133551 A1 | 5/2014 | Alshina et al. | |
| 2014/0205015 A1* | 7/2014 | Rusert | H04N 19/00769 375/240.16 |
| 2015/0208093 A1* | 7/2015 | Lee | H04N 19/105 375/240.16 |
| 2015/0341196 A1* | 11/2015 | Sorrells | H03C 1/62 375/302 |

OTHER PUBLICATIONS

Blasi et al, Frequency domain intra prediction analysis and processing for high quality video coding (Year: 2015).*
Wang R. et al.; Sub-pixel motion compensation interpolation filter in AVS (video coding); 2004 IEEE International Conference on Multimedia and EXPO (ICME), Jun. 30, 2004, pp. 93-96.
International Search Report and Written Opinion for PCT/US2017/044646; dated Sep. 18, 2017; pp. 1-14.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

DUAL FILTER TYPE FOR MOTION COMPENSATED PREDICTION IN VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to video coding using a dual filter type for motion compensated prediction.

An apparatus for encoding or decoding a video frame according to one implementation of this disclosure includes a processor configured to execute instructions stored in a non-transitory storage medium to determine whether a first component of a motion vector represents sub-pixel motion, and determine whether a second component of the motion vector represents sub-pixel motion. Responsive to a determination that the first component of the motion vector represents sub-pixel motion and a determination that the second component of the motion vector represents sub-pixel motion, a first interpolation filter for motion prediction along a first axis is determined, a second interpolation filter for motion prediction along a second axis different from the first axis is determined, the second interpolation filter being different from the first interpolation filter, the first interpolation filter is applied to pixels of a reference frame to generate a temporal pixel block, and the second interpolation filter is applied to the temporal pixel block to generate a first prediction block for a first block of the video frame. The first block of the video frame is encoded or decoded using the first prediction block.

A method for encoding or decoding a video frame according to one implementation of this disclosure includes determining a first interpolation filter for motion prediction along a first axis having a first frequency profile, determining a second interpolation filter for motion prediction along a second axis perpendicular to the first axis, the second interpolation filter having a second frequency profile different from the first frequency profile, generating a first prediction block for a first block of the video frame by applying the first interpolation filter and the second interpolation filter to pixels of a reference frame, and encoding or decoding the first block using the first prediction block.

Another method of decoding a video frame according to implementations of the teachings herein includes determining a block location within a reference frame using a motion vector and a location of a current block to be decoded within the video frame, generating one of rows of pixel values of a temporal pixel block or columns of pixel values of the temporal pixel block by applying a first interpolation filter to pixels corresponding to the block location along a first axis, generating the other of columns of pixel values for a first prediction block or rows of pixel values for the first prediction block by applying a second interpolation filter to the pixel values of the temporal pixel block along a second axis perpendicular to the first axis, the second interpolation filter being different from the first interpolation filter, decoding an encoded residual block to generate a residual block, and reconstructing the current block by combining the residual block with the first prediction block.

Variations in these and other aspects of the disclosure will be described in additional detail hereafter.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
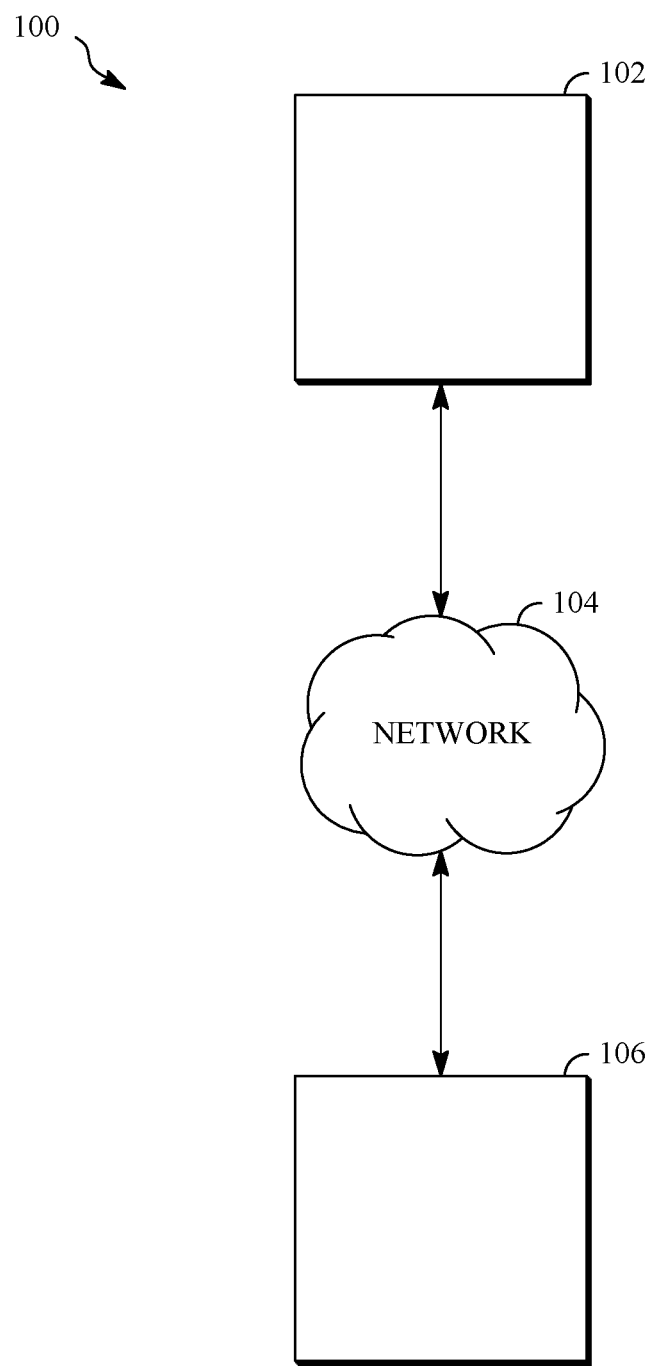
FIG. 1 is a schematic of a video encoding and decoding system.

Compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter-prediction.

One of the parameters in inter-prediction is a motion vector that represents the spatial displacement of the previously coded block relative to the current block. The motion vector can be identified using a method of motion estimation, such as a motion search. In the motion search, a portion of a reference frame can be translated to a succession of locations to form a prediction block that can be subtracted from a portion of a current frame to form a series of residuals. The horizontal and vertical translations corresponding to the location having, e.g., the smallest, residual can be selected as the motion vector. Bits representing the motion vector can be included in the encoded bitstream to permit a decoder to reproduce the prediction block and decode the portion of the encoded video bitstream associated with the motion vector.

In some situations, the prediction block that results in the best residual may not correspond with pixels in the reference frame. That is, the best motion vector may point to a location that is between pixels of blocks in the reference frame. In this case, motion compensated prediction at the sub-pixel level is useful. Motion compensated prediction may involve the use of an interpolation filter that generates filtered sub-pixel values at defined locations between the full pixels (also called integer pixels) along rows, columns, or both. The interpolation filter may be one of a number of interpolation filters available for use in motion compensated prediction, where each of the interpolation filters has a different frequency profile.

Selecting a single interpolation filter type per prediction block can result in sub-optimal compression performance. This is because the characteristics of the current block being predicted may be such that the most suitable frequency response is different in each of the vertical and horizontal directions. In implementations of this disclosure, compression performance may be improved by supporting a dual filter type that allows the selection of an interpolation filter type along each axis that uses a sub-pixel level motion vector. The identifier of the interpolation filter type per axis may then be entropy encoded using a probability model that considers the interpolation filter types of neighboring encoded blocks. Other details are described herein after first describing an environment in which the disclosure may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
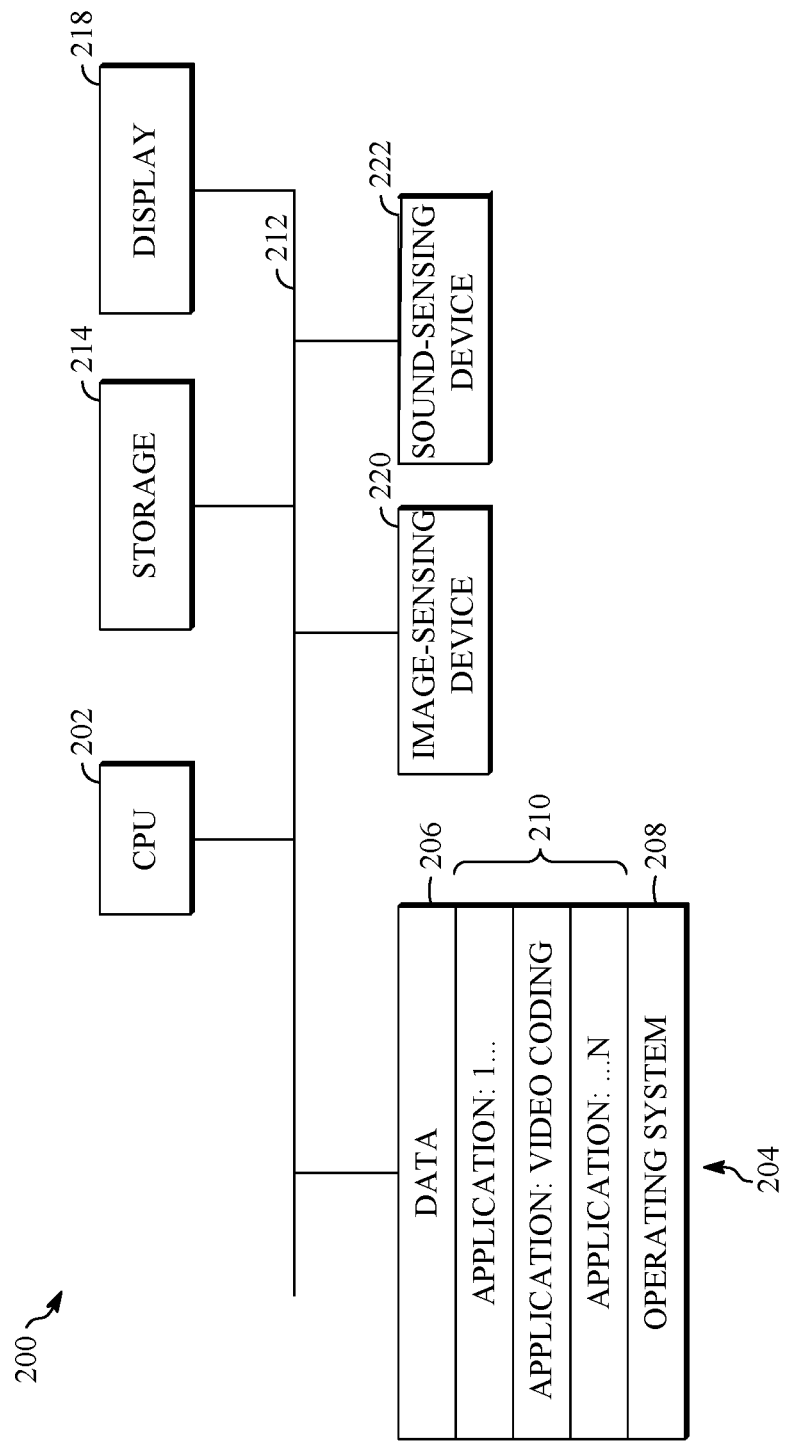
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
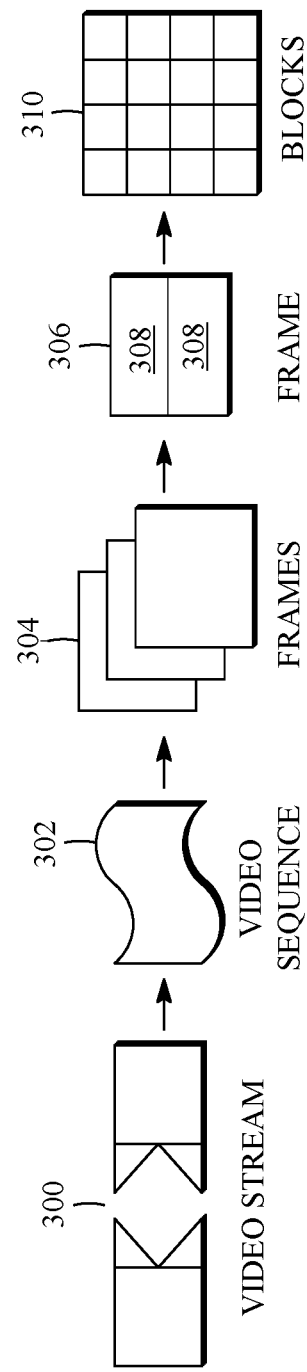
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
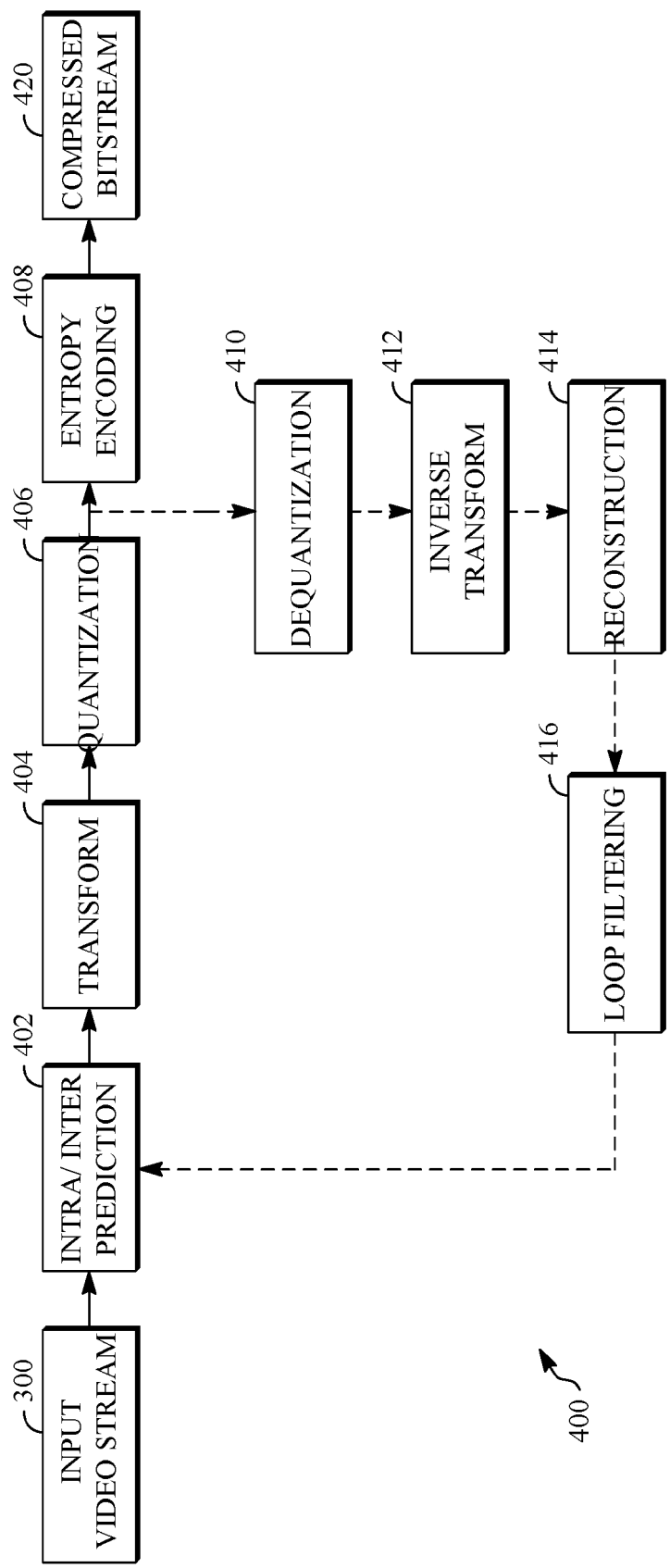
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4 and in FIG. 6, below. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
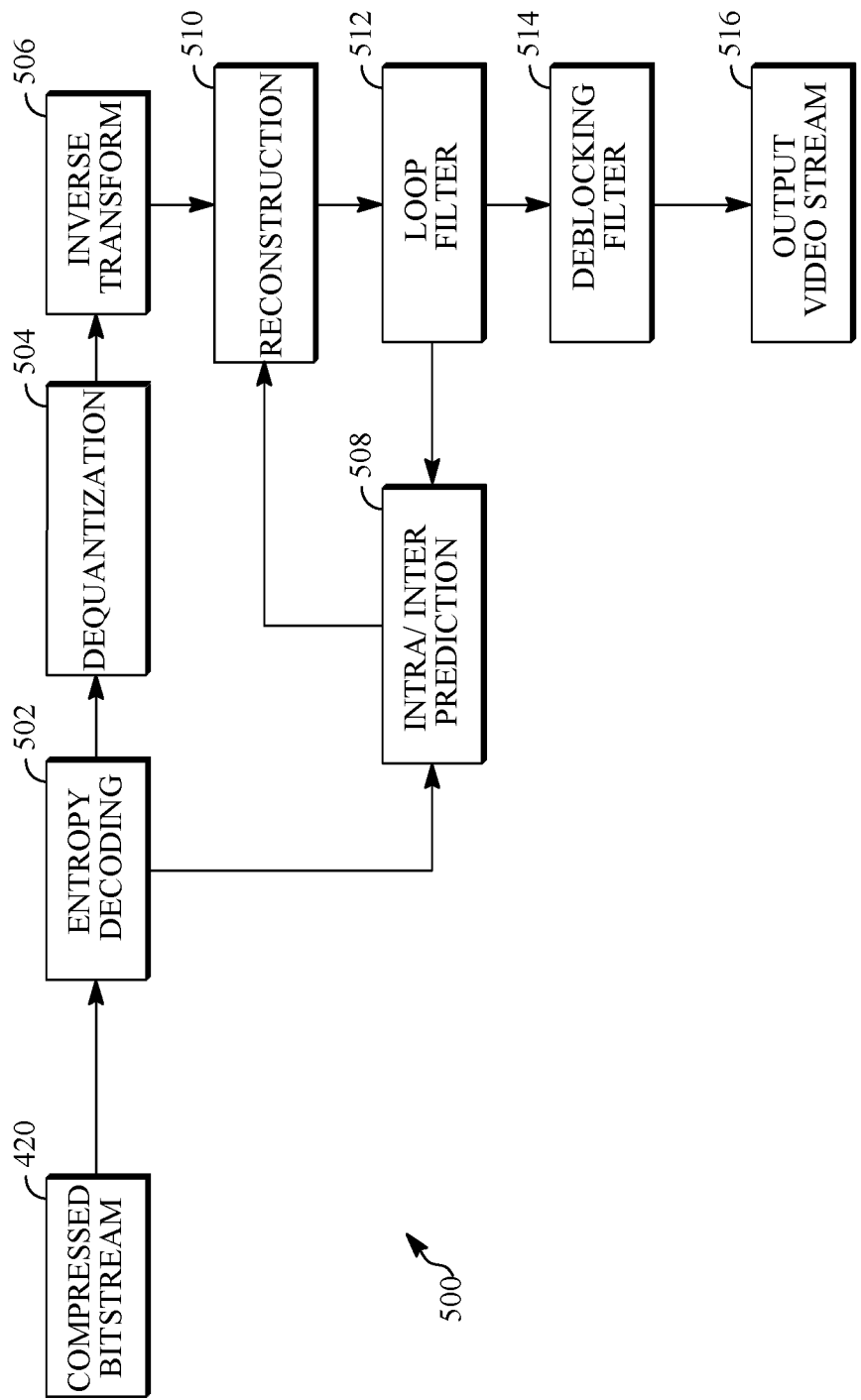
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5 and in FIG. 8 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

As described with reference to the encoder 400 of FIG. 4, a block can be encoded using intra-prediction or inter-prediction. The type of prediction used to predict a block is often referred to as a prediction mode, and there may be more than one intra-prediction mode and more than one inter-prediction mode available to encode, and subsequently decode, a block. In this case, an encoder, such as the encoder 400, may select a prediction mode by testing some or all of the available prediction modes to select the prediction mode resulting in the lowest error, the highest compression, or a combination thereof. This selection process may be performed, for example, in a rate-distortion loop of the encoder, for example in the intra/inter prediction stage 402, where the rate represents the bit cost of encoding the block and the distortion represents the errors in the decoded block as compared to the original block. As mentioned briefly above, a frame, and in particular blocks of a frame, may be encoded or decoded by motion compensated prediction (i.e., inter-prediction) using a dual filter type according to the teachings herein. As a result, interpolation filters may be used in two directions (e.g., along two axes) when a block is predicted using an inter-prediction mode. This is described in more detail with respect to FIG. 6.

Figure 6:
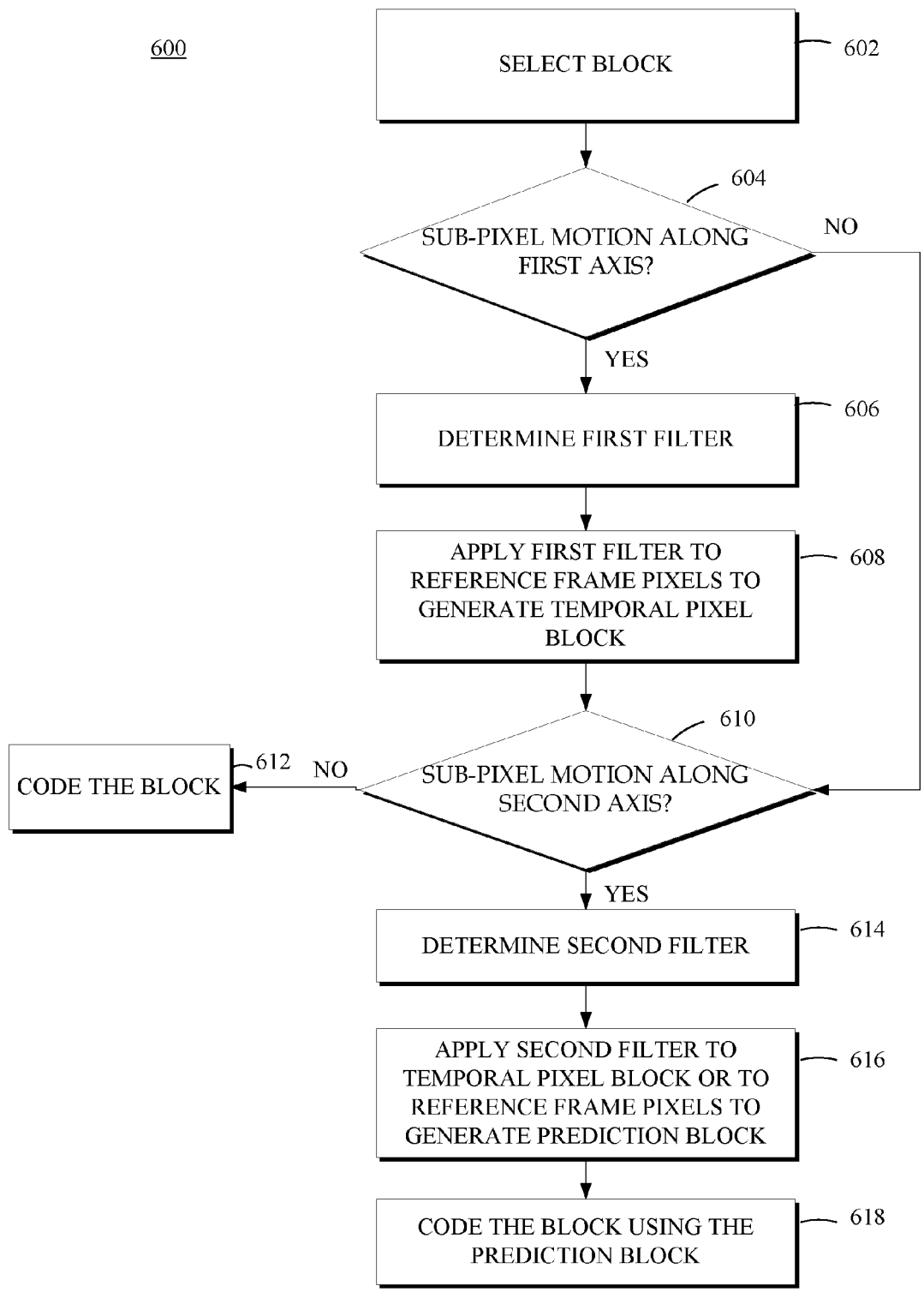
FIG. 6 is a flowchart diagram of a process for coding a video stream using a dual filter type in motion compensated prediction in accordance with an implementation of this disclosure.

FIG. 6 is a flow diagram showing a process 600 for coding a video stream using a dual filter type in motion compensated prediction in accordance with an implementation of this disclosure. Process 600 can be implemented in an encoder such as encoder 400 or in a decoder such as decoder 500 and can be implemented, for example, as a software program that can be executed by computing devices such as transmitting station 102 or receiving station 106. For example, the software program can include machine-readable instructions that can be stored in a memory such as the memory 204 or the secondary storage 214, and that can be executed by a processor, such as CPU 202, to cause the computing device to perform the process 600.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps. For simplicity of explanation, process 600 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

When the process 600 is implemented as an encoding process, video data comprising one or more frames is being encoded using a video encoder such as the encoder 400 executing on a computing device such as transmitting station 102. The video data can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder. At least some of the blocks within a frame are encoded using inter-prediction.

At 602, the process 600 selects a block, also called the first current block herein, for encoding. The current block is within a first or current frame being encoded.

At 604, a determination is made as to whether there is sub-pixel motion along a first axis. Sub-pixel motion is explained with reference to FIGS. 7A-7E, where FIG. 7A is a diagram of motion vectors representing full and sub-pixel motion in accordance with implementations of this disclosure, and FIGS. 7B-7E are diagrams of the prediction blocks of FIG. 7A.

Figure 7A:
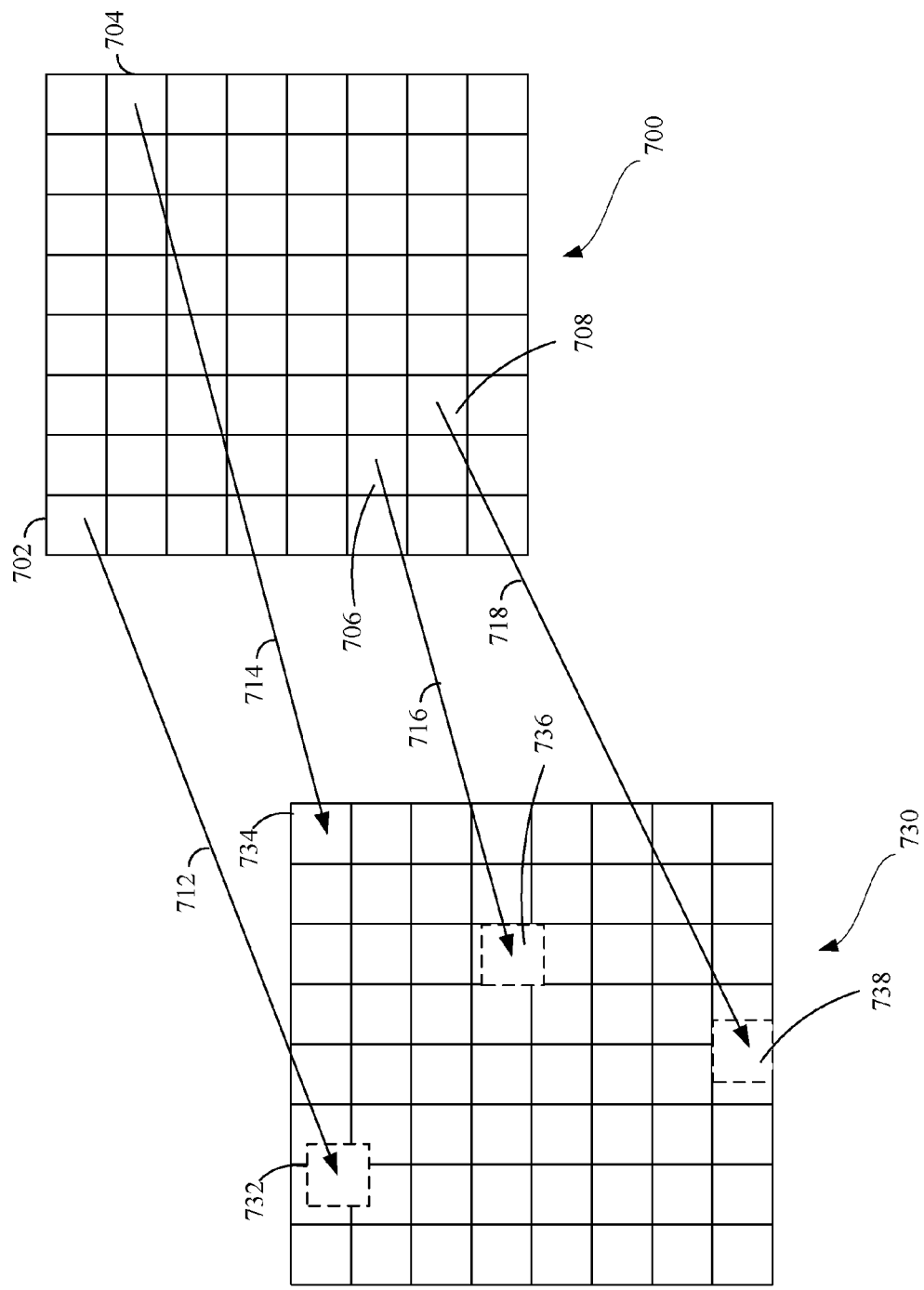
FIG. 7A is a diagram of motion vectors representing full and sub-pixel motion in accordance with implementations of this disclosure.

In FIG. 7A, several blocks 702, 704, 706, 706 of a current frame 700 are inter-predicted using pixels from a reference frame 730. In this example, the reference frame 730 is the preceding frame, also called the temporally adjacent frame, in a video sequence including the current frame 700, such as the video stream 300. The reference frame 730 is a reconstructed frame (i.e., one that has been encoded and decoded) that has been stored in a so-called last reference frame buffer and is available for coding blocks of the current frame 700. Other (e.g., reconstructed) frames, or portions of such frames may also be available for inter-prediction. Other available reference frames may include a golden frame, which is another frame of the video sequence that may be selected (e.g., periodically) according to any number of techniques, and a constructed reference frame, which is a frame that is constructed from one or more other frames of the video sequence but is not shown as part of the decoded output, such as the output video stream 516.

A prediction block 732 for encoding the block 702 corresponds to a motion vector 712. A prediction block 734 for encoding the block 704 corresponds to a motion vector 714. A prediction block 736 for encoding the block 706 corresponds to a motion vector 716. Finally, a prediction block 738 for encoding the block 708 corresponds to a motion vector 718. Each of the blocks 702, 704, 706, 708 is inter-predicted using a single motion vector and hence a single reference frame in this example, but the teachings herein also apply to inter-prediction using more than one motion vector (such as bi-prediction using two different reference frames), where pixels from each prediction are combined in some manner to form a prediction block.

Referring now to FIGS. 7B-7E, integer pixels within the reference frame 730 are shown as unfilled circles. The integer pixels, in this example, represent reconstructed pixel values of the reference frame 730. The integer pixels are arranged in an array along x- and y-axes. This may also be referred to herein as being arranged in two directions (e.g., the horizontal and vertical axes). Pixels forming the prediction blocks 732, 734, 736, 738 are shown as filled circles. As can be seen from FIG. 7B, the prediction block 732 results from sub-pixel motion along two axes. The prediction block 734 results from no sub-pixel motion along either of the two axes. The prediction block 736 results from sub-pixel motion along one axis, i.e., the vertical axis. Finally, the prediction block 738 results from sub-pixel motion along one axis, i.e., the horizontal axis.

Figure 7B:
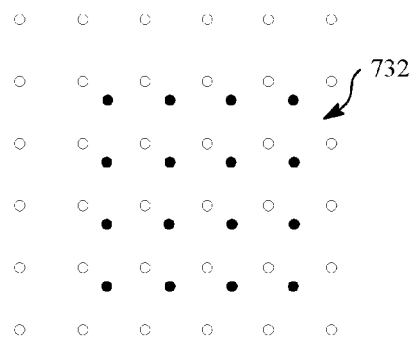
FIGS. 7B-7E are diagrams of the prediction blocks of FIG. 7A.
Figure 7C:
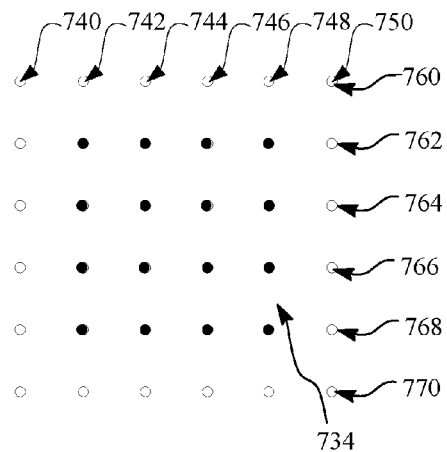
Figure 7D:
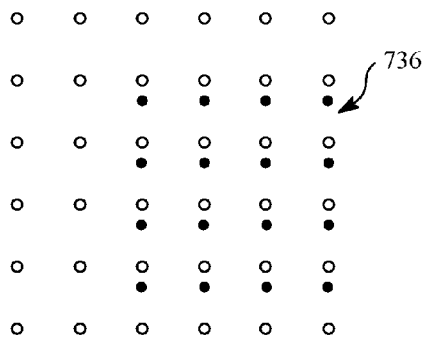

Determining whether there is sub-pixel motion along a first axis at 604 in FIG. 6 may include determining whether a first component of the motion vector represents sub-pixel motion. Referring to FIGS. 7B and 7D, for example, there is sub-pixel motion along a first axis (e.g., along the x-axis or horizontal axis). In general, a motion vector may comprise shifts in x-axis and y-axis coordinates of the form (x, y). Therefore, the shifts in the prediction blocks 732, 736 represented by the respective x-axis coordinates in the motion vectors 712 and 716 indicate sub-pixel motion. Similarly, the respective x-axis coordinates in the motion vectors 714 and 718 do not indicate sub-pixel motion.

Motion vectors may use fractional values within the coordinates that will indicate the amount of sub-pixel motion. However, and more commonly, the motion vector is represented by integer numbers, with an accuracy at a sub-pixel resolution. Where quarter-pixel resolution is used, for example, dividing a motion vector coordinate by four can identify the amount of sub-pixel motion. A remainder of 0 indicates that there is no sub-pixel motion, a remainder of 1 indicates that the amount of sub-pixel motion is a quarter-pixel, a remainder of 2 indicates that the amount of sub-pixel motion is a half-pixel, and a remainder of 3 indicates that the amount of sub-pixel motion is a three-quarter-pixel.

Reference is made back to FIG. 6. Responsive to a determination that there is sub-pixel motion along the first axis at 604 (such as a determination that the first component of the motion vector represents sub-pixel motion), a first interpolation filter for motion prediction along the first axis is determined at 606. This can be seen by reference to FIG. 8, which is a diagram of full and sub-pixel positions.

Figure 8:
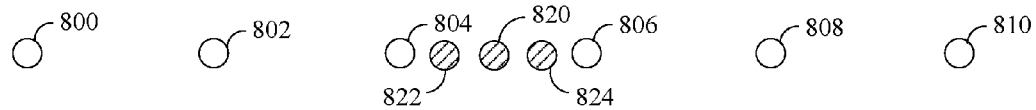
FIG. 8 is a diagram of full and sub-pixel positions.

More specifically, pixels in a reference frame are used in prediction. Not all objects move with the spacing of integer pixels. In fact, object motion is often unrelated to the block grid of frames, making the object motion between frames more like sub-pixel (also referred to as fractional) motion. FIG. 8 depicts a line of six pixels 800, 802, 804, 806, 808, 810 within a reference frame, such as the reference frame 730. For example, the line can represent a row or column within the reference frame 730. The pixels 800-810 are integer pixels. In the example of FIG. 8, there are three sub-pixel positions and hence three sub-pixels. Pixel 820 is a half-pixel between the two pixels 804 and 806, while pixels 822 and 824 are quarter-pixels between the two pixels 804 and 806. The pixels 822 and 824 may be referred to as a quarter-pixel and a three-quarter-pixel, respectively. While three sub-pixels are shown by example, higher sub-pixel accuracy may be achieved using fractional pixels at one-eighth or one-sixteenth positions between integer pixel positions. Increases in the number of fractional pixel positions generally results in an increase in computational load.

In order to produce pixel values for the sub-pixels, an interpolation process may be used. In one example, the interpolation process is performed using interpolation filters such as finite impulse response (FIR) filters. An interpolation filter may comprise a 6-tap filter, an 8-tap filter, or other size filter. The taps of an interpolation filter weight spatially neighboring integer pixels with coefficient values to generate a sub-pixel value. In general, the interpolation filter used to generate each sub-pixel value at different sub-pixel positions between two integer pixels is different (i.e., has different coefficient values).

In the example of FIG. 8, a 6-tap filter is used. This means that values for the sub-pixels or pixels 820, 822, 824 can be interpolated by applying an interpolation filter to the pixels 800-810. Only sub-pixel positions between the two pixels 804 and 806 are shown in FIG. 8. However, sub-pixel values between the other full pixels of the line of pixels can be determined in a like manner. For example, a sub-pixel value between the two pixels 806 and 808 may be determined or generated by applying an interpolation filter to the pixels 802, 804, 806, 808, 810, and an integer pixel adjacent to the pixel 810 if available.

Using different coefficient values in an interpolation filter, regardless of its size, will result in different characteristics of filtering and hence different compression performance. Trade-offs between flatness and wideness of the frequency response can be used to generate interpolation filters with different frequency profiles. Referring again to FIG. 6, the first interpolation filter may be determined at 606 from a set of available interpolation filters for motion prediction along the first axis having different frequency profiles. The set of interpolation filters can include, in some implementations, at least three interpolation filters. A set of available interpolation filters for motion prediction along the first axis may include a low-pass interpolation filter, a first base band interpolation filter having a frequency band within a first defined range, and a second base band interpolation filter having a frequency band within a second defined range narrower than the first defined range. The low-pass interpolation filter may have a cut-off frequency of 0.75, the first base band interpolation filter may have a first defined range of 1.45-1.55, and the second base band interpolation filter may have a frequency band narrower than the first defined range. In some implementations, the set of interpolation filters may be designed for 1/16-pixel precision and include at least two of a Bi-linear filter, an 8-tap filter (EIGHTTAP), a sharp 8-tap filter (EIGHTTAP_SHARP), or a smooth 8-tap filter (EIGHTTAP_SMOOTH).

The first interpolation filter determined at 606 can be one resulting from a rate-distortion loop as discussed in more detail below. Alternatively, the first interpolation filter may be determined by selecting the filter using correlations between integer pixel values and most efficient interpolation filters developed empirically. The particular technique used for determining the first interpolation filter at 606 can vary in different implementations of this disclosure.

After the first interpolation filter is determined at 606, it may be used at 608 by applying the first interpolation filter to pixels of the reference frame to generate a temporal pixel block. For example, the motion vector can be used to determine a block location within a reference frame. Then, where the first axis is along the horizontal (x-axis) direction, applying the first interpolation filter can include generating rows of pixel values of the temporal pixel block using pixels, that is, full pixel values, corresponding to the block location. The first interpolation filter is applied multiple times to generate respective pixels values in each row, and the pixels used depend upon the size of the first interpolation filter and the location of each sub-pixel as described above with regard to FIG. 8.

Either after generating the temporal pixel block at 608, or in response to a determination at 604 that there is no sub-pixel motion along the first axis, the process 600 advances to 610.

At 610, a query is made as to whether there is sub-pixel motion along a second axis different from the first axis. Generally, the second axis is perpendicular to the first axis in block-based prediction, i.e., the second axis is the y-axis when the first axis is the x-axis, or the second axis is the x-axis when the first axis is the y-axis, but it is possible to have other relationships between the two axes. If there is no sub-pixel motion along the second axis, but there is sub-pixel motion along the first axis, the process 600 advances to 612 to code the current block. For example, the temporal pixel block generated at 608 could be used as a prediction block at 612 to generate a residual that is encoded as described with respect to FIG. 4. Alternatively, where there is no sub-pixel motion along either the first axis or the second axis, the block position identified by the motion vector determines the prediction block used to generate the residual that is encoded at 612. For example, the prediction block 734 shown in FIG. 7C can be used to encode the block 704 in FIG. 7A because the motion vector 714 represents no sub-pixel motion.

Determining whether there is sub-pixel motion along the second axis at 610 may comprise determining whether a second component of the motion vector represents sub-pixel motion. As mentioned above, a motion vector may use a fractional value within its y coordinate that determines the sub-pixel motion. Alternatively, the integer value for the y coordinate may be divided by the sub-pixel resolution to generate a remainder that determines the sub-pixel motion.

Figure 7E:
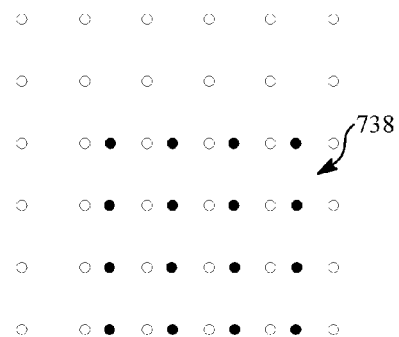

Referring to FIGS. 7B and 7E, for example, there is sub-pixel motion along a second axis (e.g., along the y-axis or vertical axis). The shifts in the prediction blocks 732, 738 represented by the y-axis coordinates in the motion vectors 712 and 718 indicate sub-pixel motion. Similarly, the y-axis coordinates in the motion vectors 714 and 716 do not indicate sub-pixel motion.

If there is sub-pixel motion along the second axis as indicated by the response to the query of 610, the process 600 advances to determining the second interpolation filter at 614. Determining the second interpolation filter at 614 can include determining a second interpolation filter that is different from the first interpolation filter, even when the sub-pixel motion (e.g., half-pixel, quarter-pixel, etc.) is the same. In some implementations, this means that the second frequency profile is different from the first frequency profile. The second interpolation filter may also be the same as the first interpolation filter for at least some blocks of a frame. The second interpolation filter can be determined at 614 from a set of available interpolation filters for motion prediction along the second axis having different frequency profiles. The set of available interpolation filters for motion prediction along the second axis can be identical to the set of available interpolation filters for motion prediction along the first axis. Alternatively, none or only some of the interpolation filters within the two sets can be shared.

The second interpolation filter determined at 614 can be one resulting from a rate-distortion loop as discussed in more detail below. Alternatively, the second interpolation filter may be determined by selecting the filter using correlations between integer pixel values and most efficient interpolation filters developed empirically. The particular technique used for determining the second interpolation filter at 614 can vary in different implementations of this disclosure, and can be different from or the same as the technique used to select the first interpolation filter at 604.

After the second interpolation filter is determined at 614, it is used at 616 to generate a prediction block. The prediction block can be generated by applying the second interpolation filter to the temporal pixel block or to pixels of the reference frame. For example, where there is no sub-pixel motion along the first axis as indicated by the response to the query at 604, generating the prediction block includes applying the second interpolation filter to the reference frame pixels at a location indicated within the reference frame indicated by the motion vector.

Alternatively, and responsive to a determination that the first component of the motion vector represents sub-pixel motion (at 604) and a determination that the second component of the motion vector represents sub-pixel motion (at 610), the second interpolation filter is applied to the temporal pixel block to generate the prediction block for the current block at 616. Applying the second interpolation filter to the temporal pixel block can include generating columns of pixel values for the prediction block using the pixel values of the temporal pixel block. The second interpolation filter is applied multiple times to generate respective pixels values in each column, and the pixels used depend upon the size of the second interpolation filter and the location of each sub-pixel as described with regard to FIG. 8.

However the prediction block is generated, it can be used to code the current block at 618. For example, the prediction block and the current block are used to generate a residual, and the residual is encoded at 618. In some implementations, coding the block at 612 or at 618 includes inserting the encoded block and flags or bits indicating interpolation filter(s) used to encode the block. The flags or bits may be included in a header for the block, a segment including the block, or a frame including the block. For example, if the set of available interpolation filters for prediction along both axes includes the same three types of interpolation filters, the type of interpolation filter from the set may be identified by a two-bit binary value of 0 (00), 1 (01), or 2 (11). Flags may indicate along which axes the interpolation filters are used. A first flag may indicate whether a first interpolation filter is used for prediction along the first axis. If so, the first flag can be encoded with a value of 1, followed by the two bits representing the type for the first interpolation filter. If not, the first flag can be encoded with a value of 0 without an identifier for a first interpolation filter type. In either case, a second flag may indicate whether a second interpolation filter is used for prediction along the second axis. If so, the second flag can be encoded with a value of 1, followed by the two bits representing the type of the second interpolation filter. If not, the second flag can be encoded with a value of 0 without an identifier for a second interpolation filter type. In this way, if a block has only one axis using prediction at the sub-pixel level, the other axis uses full-pixel motion offset. Accordingly, only a single filter type is needed for such blocks.

In entropy coding the filter type for the first axis, the neighbors in the scan order (i.e., the above and left neighbors in a raster scan order) may be checked for their filter type used for the first axis. If the two neighbors share a common filter type in this example, a probability model is assigned that favors the same filter type. Otherwise, a probability model is assigned that tends toward an even distribution for all of the available filter types of the set of available interpolation filters. Entropy coding the filter type for the second axis may be performed using the same approach.

The process 600 may be performed for each block of a frame that is predicted using inter-prediction. The process 600 may be performed as part of a prediction process that determines the best mode for prediction of the current block selected at 602. For example, the process 600 can be implemented in whole or in part within a rate-distortion loop, such as at the intra/inter prediction stage 402, or may be implemented as a separate process providing input to the rate-distortion loop. Further, the process 600 may be implemented, at least in part, after the rate-distortion loop.

During a rate-distortion loop, for example, a common technique for determining the best inter-prediction mode comprises doing a motion search within one or more reference frames for the best matching block using integer pixels. Then, a search is performed to determine whether sub-pixels would provide a better match. In such cases, the search may be performed starting with position of the best matching block using the integer pixels and testing some or all of the sub-pixel positions (and hence the related motion vectors) between those integer pixels and respective adjacent integer pixels to the left, right, top, bottom, or diagonal, or any combination. In order to determine whether the sub-pixel positions result in a better prediction block, the sub-pixel values resulting from applying the first interpolation filter at 608, applying the second interpolation filter at 616, or both, may be used.

Determining the first interpolation filter at 604, determining the second interpolation filter 614, or both, may be performed within a rate-distortion loop. For example, and with reference to FIG. 7C, the prediction block 734 is formed of integer pixels. Assuming that the prediction block 734 is the best predictor for the block 704 resulting from a motion search of integer pixels within the reference frame 730, and the sub-pixel resolution is one-quarter pixel, motion searches may be completed for sub-pixel motion along the first axis, such as motion along the x-axis or horizontal axis between columns 740 and 742, 742 and 744, 744 and 746, and 746 and 748, between columns 742 and 744, 744 and 746, 746 and 748, and 748 and 750, or both. In some implementations, the motion search may be performed using sub-pixel values for the one-quarter-pixel, one-half-pixel, and three-quarter-pixel locations between these columns. The motion search may be performed using only some of sub-pixel values the one-quarter-pixel, one-half-pixel, and three-quarter-pixel locations between these columns. For example, the sub-pixels related to the one-half-pixel locations could be searched first. If the sub-pixels at the one-half-pixel locations between the columns 740 and 742, 742 and 744, 744 and 746, and 746 and 748 produce a better predictor than those at the one-half-pixel locations between the columns 742 and 744, 744 and 746, 746 and 748, and 748 and 750, only the sub-pixels at the one-quarter-pixel locations, the three-quarter-pixel locations, or both between the columns 740 and 742, 742 and 744, 744 and 746, and 746 and 748 may be searched. That is, the motion search could omit the sub-pixels at the one-quarter-pixel locations, the three-quarter-pixel locations, or both between the columns 742 and 744, 744 and 746, 746 and 748, and 748 and 750. At each of the sub-pixel locations, the values for the sub-pixels may be generated using one or more available interpolation filters (e.g., by applying an interpolation filter as described with regard to 608 of FIG. 6). An exhaustive search using sub-pixels generated using each available filter in for each increment of sub-pixel motion is possible, but techniques for reducing the computational load are possible. For example, motion searches to determine the best prediction block of at least some sub-pixel locations may be tested using a single type of interpolation filter, then the remaining interpolation filters could be applied to determine if there is any improvement in coding efficiency of the current block (such as through an improved rate-distortion value) resulting from the alternative prediction blocks.

In a like manner, determining an interpolation filter for sub-pixel motion along the second axis, such as motion along the y-axis or vertical axis, may be performed. For example, and again with reference to FIG. 7C, in addition to the motion search that produced the prediction block 734, motion searches may be completed for sub-pixel motion along the second axis, such as motion between rows 760 and 762, 762 and 764, 764 and 766, and 766 and 768, between rows 762 and 764, 764 and 766, 766 and 768, and 768 and 770, or both. The exhaustive search of each combination of interpolation filter type for motion prediction along the second axis and sub-pixel location along the second axis may be performed, or techniques that reduce the computational load may be used by performing only some of the combinations based on the results of one or more previous calculations.

When sub-pixel motion is only along a first axis, or is only along a second axis, only one interpolation filter is determined as integer motion is used on the other axis, e.g., based on which of the prediction blocks generated as described above is the best predictor for the current block. When sub-pixel motion is along both axes, one technique for determining the first interpolation filter and the second interpolation filter, and hence generating the best predictor, includes, for different combinations of the first interpolation filter and the second interpolation filter, generating a respective test block. The test blocks may be generated by applying the first interpolation filter to reference frame pixels to generate a temporal pixel block at 608, followed by applying the second interpolation filter to the temporal pixel block at 616. The resulting prediction block is a test block for the combination of interpolation filters. Other ways of generating the test blocks may be used. Another non-limiting example includes generating a first temporal pixel block applying the first interpolation filter to reference frame pixels, generating a second temporal pixel block applying the second interpolation filter to reference frame pixels (instead of to the first temporal pixel block), and combining the first and second temporal pixel blocks (e.g., by averaging the values).

However the test blocks are generated, an efficiency coding value for encoding the current block using each test block may be generated. In a rate-distortion loop, this efficiency coding value commonly compares the cost of encoding the block using the test block in bits (i.e., the rate) with the errors in pixel values in the reconstructed block as compared to the current block (i.e., the distortion). A combination of first and second interpolation filters may be selected based on the efficiency coding values. For example, the test block that results in the lowest rate relative to the distortion (e.g., the lowest rate-distortion value) may be selected as the best predictor. The combination of first and second interpolation filters for that test block determines the first interpolation filter and the second interpolation filter for the process 600.

Where the set of available interpolation filters is the same for each of the first interpolation filter and the second interpolation filter, and the set includes three available interpolation filters, testing all combinations of interpolation filters for a sub-pixel position includes nine test blocks. Testing all sub-pixel positions with all combinations of filters may be done. In some cases, however, computational efficiency may be improved by reducing the number of calculations for the combination of interpolation filters in addition to the reduction in the number of sub-pixel positions tested as described in the examples related to FIG. 7C discussed above.

In one example, this reduction may be achieved by selecting, for a particular sub-pixel position, a first available interpolation filter from a set of available interpolation filters for sub-pixel motion along the first axis that has a frequency response at or near the middle of the extremes of the frequency responses (e.g., a filter that is between one or more filters that keep a relatively large number of frequencies and one or more other filters that filter out a relatively large number of frequencies). Fixing this available interpolation filter for the first axis, one or more of the set of available interpolation filters for sub-pixel motion along the second axis can be used to generate test prediction blocks, which in turn are used to generate residual blocks that are encoded. The rate-distortion values for each of these test prediction blocks may be compared to determine which test prediction block is the best predictor for the current block. Then, the interpolation filter for sub-pixel motion along the second axis that results in the best predictor is fixed, and one or more remaining available interpolation filters from the set of available interpolation motion along the first axis (e.g., other than the first available interpolation filter initially selected) are used to generate respective test prediction blocks, which are in turn used to generate residual blocks that are encoded. The one with the best (e.g., lowest) rate-distortion value is considered the best predictor, and the first and second interpolation filters used are the filters determined at 606 and 614 and applied at 608, 616. The prediction block can then be used to encode the block at 618.

In one example where the set of available interpolation filters for motion prediction along the first axis and the set of available interpolation filters for motion prediction along the second axis have different frequency profiles, the first and second interpolation filters may be determined by selecting a first available interpolation filter having a first frequency profile from the set of available interpolation filters for motion prediction along the first axis, applying the first available interpolation filter to at least some of the pixels of a reference frame to generate a first initial test block, applying, to the first initial test block, at least two available interpolation filters of the set of available interpolation filters for motion prediction along the second axis to generate respective intermediate test blocks, and selecting a first intermediate test block of the intermediate test blocks based on comparing efficiency coding values for encoding a current block using each intermediate test block. Then, a first available interpolation filter of the set of available interpolation filters for motion prediction along the second axis is applied to at least some of the pixels of the reference frame to generate a second initial test block where the first available interpolation filter is used to generate the first intermediate test block. A second available interpolation filter of the set of available interpolation filters for motion prediction along the first axis is applied to the second initial test block to generate a second intermediate test block. The first interpolation filter and the second interpolation filter are selected based on comparing an efficiency coding value of encoding the first block using the first intermediate test block and encoding the first block using the second intermediate test block. For example, the most efficiently coded test block is determine based on the comparison, and the interpolation filters used to code that test block are selected.

The sets of available interpolation filters may be identical. That is, there may be one set of available interpolation filters. Whether or not the sets are identical or not, the set of available interpolation filters for motion prediction along the first axis may include three interpolation filters described above in an example, namely a low-pass interpolation filter, a first base band interpolation filter having a frequency band within a first defined range, and a second base band interpolation filter having a frequency band within a second defined range narrower than the first defined range. In this case, the first available interpolation filter from the set of available interpolation filters for motion prediction along the first axis may include the first base band interpolation filter.

When the process 600 is implemented as a decoding process, video data comprising one or more frames is being decoded using a video decoder such as the decoder 500 executing on a computing device such as the transmitting station 102 or the receiving station 106. The video data can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating encoded video data. At least some of the blocks within a frame are encoded using inter-prediction, and hence will be decoded using inter-prediction.

At 602, the process 600 selects a block, also called the first or current block herein, for decoding. The current block is within a first or current frame being decoded.

At 604, a determination is made as to whether there is sub-pixel motion along a first axis in the inter-prediction of the block. An implicit determination may include the techniques described with respect to 604 and 610 in the encoding process. For example, if the motion vector used to encode the current block uses a fractional value within its x coordinate, this fractional value (such as one-quarter, one-half, etc.) determines the sub-pixel motion. In another example of implicit determination, the integer value for the x coordinate may be divided by the sub-pixel resolution to generate a remainder that determines the sub-pixel motion as described above. The motion vector mode indicating the motion vector is generally decoded from the header of the current block, a slice or segment including the current block or the current frame.

An explicit technique may be used with flags or bits indicating whether there is sub-pixel motion along the first axis at 604. For example, and as described above, the encoder may include inserting the encoded block and flags or bits indicating interpolation filter(s) used to encode the block Like the motion vector mode, the flags or bits may be included in a header encoded into the encoded bitstream. If the flags or bits are entropy coded as described above, they may be similarly decoded. In one example, a first flag indicates whether a first interpolation filter is used for prediction along the first axis (e.g., a single bit value of 1 or 0). The value of the first flag thus provides a response to the query at 604.

Whether the query at 604 is answered implicitly or explicitly, the process 600 advances to 606 to determine the first interpolation filter for motion prediction along the first axis when there is sub-pixel motion along the first axis. The bits, such as the two bits described above, may be used to determine the first interpolation filter by selecting one of the set of filters from a list of filters using the bits and/or the value associated with the bits. For example, the bits may be used as indices in a list stored in the encoder and decoder.

At 608, the first interpolation filter is applied in the same manner as the encoder applies the first interpolation filter. In the example shown in FIG. 6, the first interpolation filter is applied to reference frame pixels to generate a temporal pixel block. The reference frame pixels are identified by the motion vector and a reference frame identifier transmitted by the encoder.

Thereafter, the process 600 determines whether there is sub-pixel motion along the second axis at 610. The techniques used at 610 may be the same as used at 604. In one example, this includes decoding a flag that indicates whether or not a second interpolation filter is encoded into the bitstream. If so, the process 600 advances to apply the second interpolation filter at 616 in the same manner as the encoder applies the second interpolation filter. In the example shown in FIG. 6, the second interpolation filter is applied to the temporal pixel block to generate the prediction block when there is a first interpolation filter (i.e., where there is sub-pixel motion along the first axis at 604). Otherwise, the second interpolation filter is applied to the reference frame pixels identified by the motion vector and reference frame to generate the prediction block (i.e., where there is no sub-pixel motion along the first axis at 604).

The block is coded, here decoded, using the prediction block at 618. For example, an encoded residual block is decoded from an encoded bitstream. The decoded residual block is combined with the prediction block generated at 616 to reconstruct the block.

If there is only sub-pixel motion along the first axis (e.g., the response to the query at 604 is yes and the response to the query at 610 is no), coding the block at 612 includes decoding the block by decoding the encoded residual block from the encoded bitstream, and combining the decoded residual block with the temporal pixel block generated at 608 as the prediction block. If there is no sub-pixel motion along either the first axis or the second axis (e.g., the responses to the queries at 604 and 610 are both no), coding the block at 612 includes decoding the block by decoding the encoded residual block from the encoded bitstream, and combining the decoded residual block with a prediction block generated from the motion vector and the reference frame.

While the process 600 is described in one sequence by example, decoding the block selected at 602 may be performed in other orders. For example, generating a prediction block for the block of the video frame may be performed by determining the second interpolation filter at 614, when used, after determining the first interpolation filter at 606, followed by applying the first interpolation filter and the second interpolation filters to pixels of the reference frame. Combining the two interpolation filters to generate a prediction block is also possible.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for encoding or decoding a video frame, comprising:
   a processor configured to execute instructions stored in a non-transitory storage medium to:
   determine whether a first component of a motion vector represents sub-pixel motion;
   determine whether a second component of the motion vector represents sub-pixel motion;
   responsive to a determination that the first component of the motion vector represents sub-pixel motion and a determination that the second component of the motion vector represents sub-pixel motion:
   determine a first interpolation filter for motion prediction using the motion vector along a first axis;
   determine a second interpolation filter for motion prediction using the motion vector along a second axis different from the first axis, the second interpolation filter being different from the first interpolation filter;
   apply the first interpolation filter to pixels of a reference frame identified using the motion vector to generate a temporal pixel block; and
   apply the second interpolation filter to the temporal pixel block to generate a first prediction block for a first block of the video frame; and
   at least one of:
   encode the first block of the video frame using the first prediction block by producing a residual block as a difference between the first block and the first prediction block, and encoding the residual block into an encoded bitstream for decoding by a decoder; or
   decode the first block of the video frame using the first prediction block by decoding an encoded residual block from the encoded bitstream to generate a residual block, and reconstructing the first block for display by combining the residual block with the first prediction block.

2. The apparatus of claim 1, wherein the first interpolation filter has a first frequency profile and the second interpolation filter has a second frequency profile.

3. The apparatus of claim 1, wherein the processor is configured to execute instructions stored in the non-transitory storage medium to determine the first interpolation filter from a set of available interpolation filters for motion prediction along the first axis having different frequency profiles and to determine the second interpolation filter from a set of available interpolation filters for motion prediction along the second axis having different frequency profiles.

4. The apparatus of claim 3, wherein the set of available interpolation filters for motion prediction along the first axis and the set of available interpolation filters for motion prediction along the second axis are identical.

5. The apparatus of claim 1, wherein the processor is configured to execute instructions stored in the non-transitory storage medium to determine the first interpolation filter and determine the second interpolation filter by:
   selecting a first available interpolation filter having a first frequency profile from a set of available interpolation filters for motion prediction along the first axis having different frequency profiles;
   applying the first available interpolation filter to at least some of the pixels of the reference frame identified using the motion vector to generate a first initial test block;
   applying, to the first initial test block, at least two available interpolation filters of a set of available interpolation filters for motion prediction along the second axis having different frequency profiles to generate respective intermediate test blocks;

selecting a first intermediate test block of the intermediate test blocks based on comparing efficiency coding values for encoding the first block using each intermediate test block;

applying a first available interpolation filter of the set of available interpolation filters for motion prediction along the second axis to at least some of the pixels of the reference frame identified using the motion vector to generate a second initial test block, the first available interpolation filter used to generate the first intermediate test block;

applying, to the second initial test block, a second available interpolation filter of the set of available interpolation filters for motion prediction along the first axis to generate a second intermediate test block; and selecting the first interpolation filter and the second interpolation filter based on comparing an efficiency coding value of encoding the first block using the first intermediate test block and encoding the first block using the second intermediate test block.

6. The apparatus of claim 5, wherein the set of available interpolation filters for motion prediction along the first axis and the set of available interpolation filters for motion prediction along the second axis are identical.

7. The apparatus of claim 5, wherein the set of available interpolation filters for motion prediction along the first axis comprises a low-pass interpolation filter, a first base band interpolation filter having a frequency band within a first defined range, and a second base band interpolation filter having a frequency band within a second defined range narrower than the first defined range.

8. The apparatus of claim 7, wherein the first available interpolation filter from the set of available interpolation filters for motion prediction along the first axis comprises the first base band interpolation filter.

9. The apparatus of claim 1, wherein the first axis comprises rows of pixel values and the second axis comprises columns of pixel values.

10. A method for encoding or decoding a video frame, comprising:
determining a first interpolation filter for motion prediction using a motion vector along a first axis having a first frequency profile;
determining a second interpolation filter for motion prediction using the motion vector along a second axis perpendicular to the first axis, the second interpolation filter having a second frequency profile different from the first frequency profile;
generating a first prediction block for a first block of the video frame by applying the first interpolation filter and the second interpolation filter to pixels of a reference frame identified using the motion vector; and
at least one of:
encoding the first block using the first prediction block by producing a residual block as a difference between the first block and the first prediction block, and encoding the residual block into an encoded bitstream for decoding by a decoder; or
decoding the first block using the first prediction block by decoding an encoded residual block from the encoded bitstream to generate a residual block, and reconstructing the first block for display by combining the residual block with the first prediction block.

11. The method of claim 10, wherein:
determining the first interpolation filter comprises:
determining, from an encoded bitstream including the video frame, a value of a first flag; and
upon a condition that the first flag indicates the first interpolation filter was used for motion prediction of the first block, determining, from the encoded bitstream, an identifier of the first interpolation filter; and
determining the second interpolation filter comprises:
determining, from an encoded bitstream including the video frame, a value of a second flag; and
upon a condition that the second flag indicates the second interpolation filter was used for motion prediction of the first block, determining, from the encoded bitstream, an identifier of the second interpolation filter.

12. The method of claim 10, wherein the first axis is a horizontal axis and the second axis is a vertical axis, the method further comprising:
determining a block location within the reference frame using the motion vector;
applying the first interpolation filter comprises generating rows of pixel values of a temporal pixel block using pixels corresponding to the block location; and
applying the second interpolation filter comprises generating columns of pixel values for the first prediction block using the pixel values of the temporal pixel block.

13. The method of claim 10, wherein determining the first interpolation filter and determining the second interpolation filter comprises:
for different combinations of the first interpolation filter and the second interpolation filter from a set of available interpolation filters, generating a respective test block;
for each test block, generating an efficiency coding value for encoding the first block using the test block; and
selecting a combination of the first interpolation filter and the second interpolation based on the efficiency coding values.

14. The method of claim 13, wherein the set of available interpolation filters comprises a low-pass interpolation filter, a first base band interpolation filter having a frequency band within a first defined range, and a second base band interpolation filter having a frequency band within a second defined range narrower than the first defined range.

15. The method of claim 10, further comprising:
determining a block location within a reference frame using the motion vector;
applying the first interpolation filter to the pixels of the reference frame to generate a temporal pixel block by generating one of rows of pixel values of the temporal pixel block or columns of pixel values of the temporal pixel block using pixels corresponding to the block location; and
applying the second interpolation filter to the temporal pixel block to generate the first prediction block for the first block by generating the other of columns of pixel values for the first prediction block or rows of pixel values for the first prediction block using the pixel values of the temporal pixel block.

16. A method of decoding a video frame, comprising:
receiving an encoded residual block from an encoded bitstream;
determining a block location within a reference frame using a motion vector and a location of a current block to be decoded within the video frame;
generating one of rows of pixel values of a temporal pixel block or columns of pixel values of the temporal pixel block by applying a first interpolation filter to pixels corresponding to the block location along a first axis;

generating a prediction block by applying a second interpolation filter to the pixel values of the temporal pixel block along a second axis perpendicular to the first axis, the second interpolation filter different from the first interpolation filter;

decoding the encoded residual block from the encoded bitstream to generate a residual block; and reconstructing the current block for display by combining the residual block with the prediction block.

17. The method of claim 16, further comprising:

determining, from an encoded bitstream including the video frame, a value of a first flag;

upon a condition that the first flag indicates the first interpolation filter was used for motion prediction, determining, from the encoded bitstream, an identifier of the first interpolation filter;

determining, from an encoded bitstream including the video frame, a value of a second flag; and upon a condition that the second flag indicates the second interpolation filter was used for motion prediction, determining, from the encoded bitstream, an identifier of the second interpolation filter.

18. The method of claim 17, wherein the identifier of the first interpolation filter identifies the first interpolation filter within a set of available interpolation filters, and the identifier of the second interpolation filter identifies the second interpolation filter within the set of available interpolation filters.

19. The method of claim 18, wherein the set of available interpolation filters comprises three interpolation filters, each interpolation filter having a different frequency profile.

* * * * *